Dec. 13, 1966     E. C. CRITTENDEN, JR     3,292,160
SUPERCONDUCTIVE PERSISTENT CURRENT CIRCUITS
Filed June 5, 1957     3 Sheets-Sheet 1
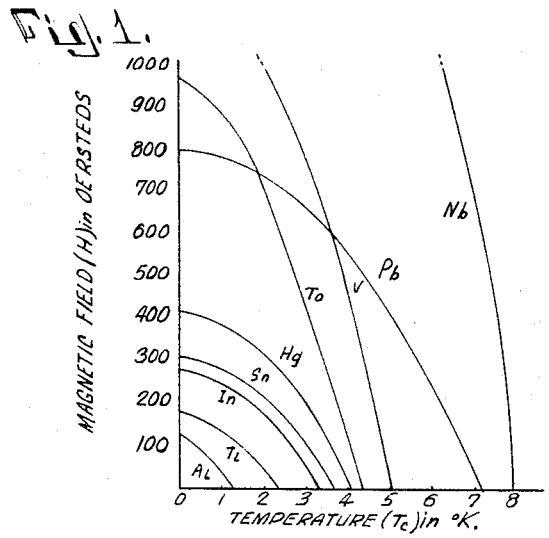
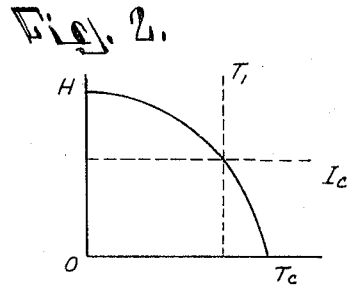
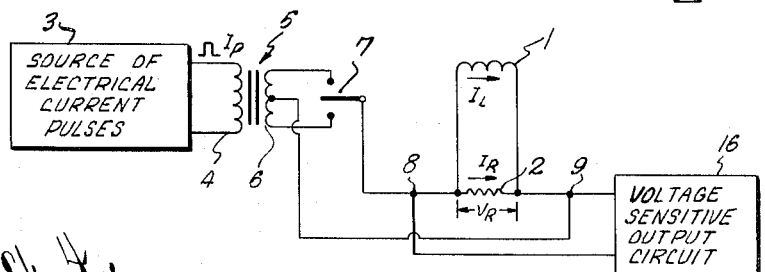
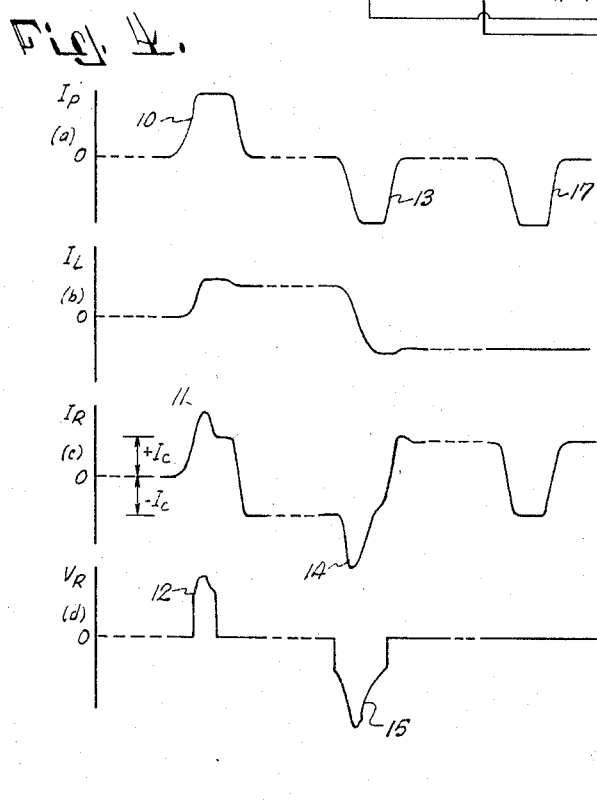
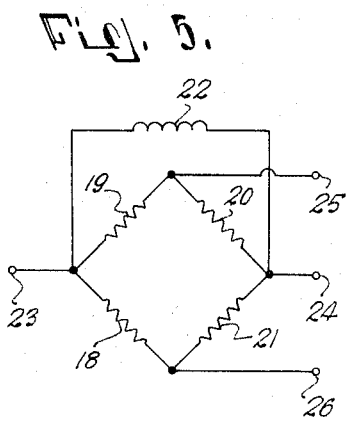
INVENTOR.
EUGENE C. CRITTENDEN, JR.
BY Robert H. Brown
ATTORNEY.

Dec. 13, 1966  E. C. CRITTENDEN, JR  3,292,160

SUPERCONDUCTIVE PERSISTENT CURRENT CIRCUITS

Filed June 5, 1957  3 Sheets-Sheet 2

INVENTOR.
EUGENE C. CRITTENDEN, JR.
BY
ATTORNEY.

Dec. 13, 1966 E. C. CRITTENDEN, JR 3,292,160
SUPERCONDUCTIVE PERSISTENT CURRENT CIRCUITS
Filed June 5, 1957 3 Sheets-Sheet 3
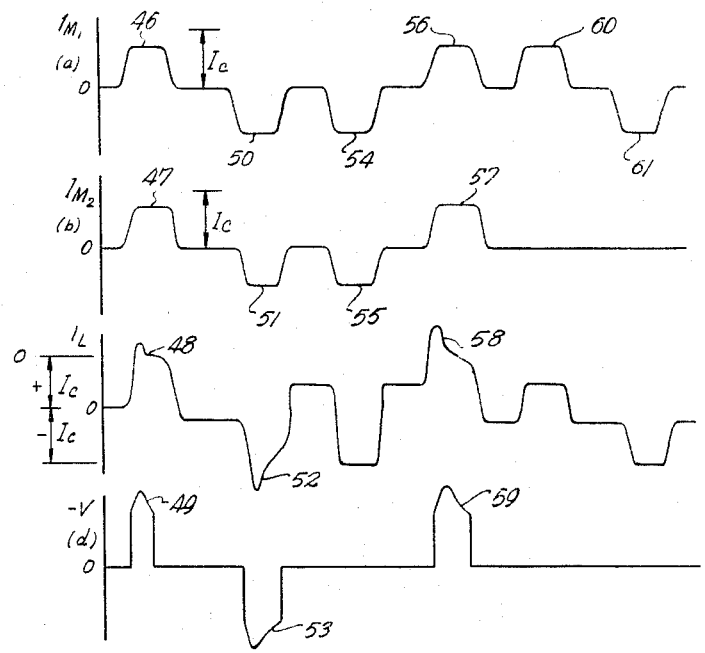
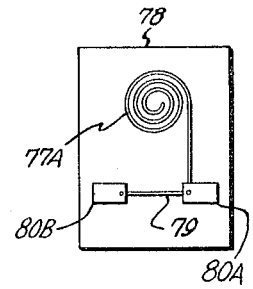
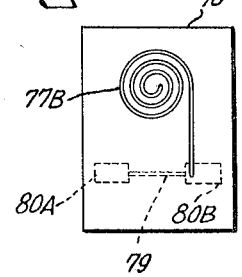
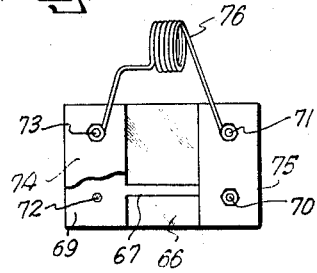
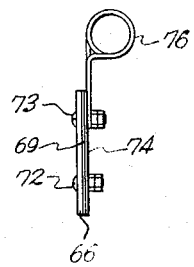
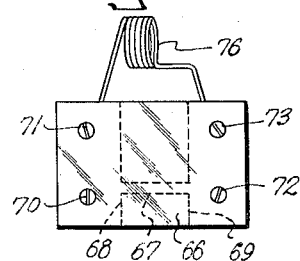
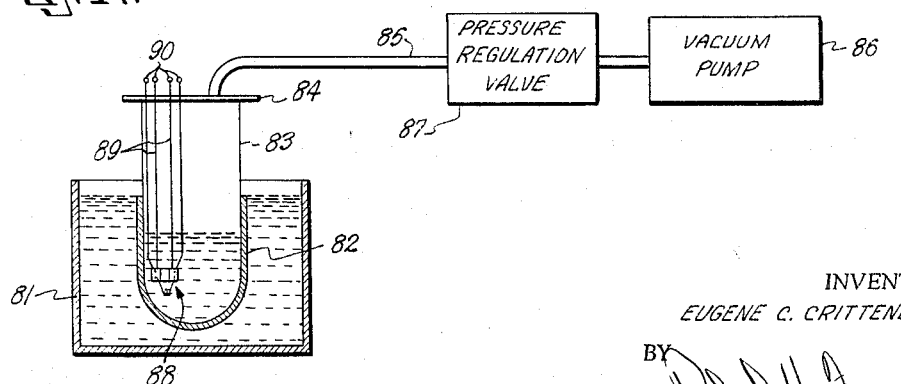
INVENTOR.
EUGENE C. CRITTENDEN, JR.
BY
Robert H. Fraser
ATTORNEY.

United States Patent Office 3,292,160
Patented Dec. 13, 1966

3,292,160
SUPERCONDUCTIVE PERSISTENT
CURRENT CIRCUITS
Eugene C. Crittenden, Jr., Monterey, Calif., assignor, by mesne assignments, to The Bunker-Ramo Corporation, Stamford, Conn., a corporation of Delaware
Filed June 5, 1957, Ser. No. 663,668
11 Claims. (Cl. 340—173.1)

This invention relates to electrical circuits and more particularly to a new and improved electrical circuit including superconductive components.

In data processing systems and digital computers it is frequently necessary to store information in an accessible manner. Generally, electrical circuits for this purpose are adapted to function in distinctly separate modes of operation, usually two in number, so that the existence of a particular mode of operation in the circuit is indicative of a stored value.

With systems and computers in which vast quantities of numerical information must be handled rapidly, the need has arisen for a compact information storage device having a degree of reliability and a speed of operation not previously known.

Accordingly, it is one object of the present invention to provide an improved electrical circuit for storing information.

It is another object of the present invention to provide a reliable information storage device which is capable of high speed operation.

It is a further object of the present invention to provide an information storage device which is small in size and simple of construction.

Briefly, the electrical circuit of the invention comprises a circuit loop including two conductors constructed of superconductive materials. One of the conductors is capable of switching to a resistive condition when the current therethrough exceeds a critical value. The other of the conductors remains superconducting for currents in excess of the critical value of current at which the first conductor is switched to a resistive condition. When both conductors are superconducting, the circuit loop is capable of storing a persistent circulating current with the direction of the persistent current being indicative of stored information. In a particular embodiment, the direction of persistent current flow may be sensed by applying a current pulse to the circuit loop. When a sensing current pulse is additive with respect to the persistent current flowing through the conductor having the lower critical current value, the conductor having the lower critical current value ceases being superconducting momentarily, the direction of persistent current flow reverses, and a voltage pulse appears in the circuit loop. On the other hand, where a sensing current pulse is subtractive with respect to the persistent current flowing through the conductor having the lower critical current value, the entire circuit loop remains superconducting, no voltage pulse appears, and the direction of persistent current flow is unaffected.

A better understanding of the invention may be had from a reading of the following detailed description and an inspection of the drawings, in which:

FIG. 1 is a graph illustrating the variation in transition temperatures for various materials subjected to a magnetic field;

FIG. 2 is a graph of the transition temperature of a particular material as a function of a magnetic field;

FIG. 3 is a combined block and schematic circuit diagram of the an electrical circuit of the invention;

FIG. 4 is a set of graphs illustrating current and voltage waves appearing in the circuit of FIG. 3;

FIG. 5 is a schematic circuit diagram of an electrical circuit including a bridge;

FIG. 9 is a set of graphs illustrating various current and voltage waves which may be applied to and derived from the circuit of FIG. 8;

FIG. 11 is a front view of an electrical circuit of the invention;

FIG. 12 is a side view of the circuit of FIG. 11;

FIG. 13 is a rear view of the circuit of FIG. 11;

FIG. 14 is a front view of a printed type electrical circuit constructed in accordance with the invention;

FIG. 15 is a rear view of the printed electrical circuit of FIG. 14;

FIG. 17 is a diagrammatic view of apparatus for maintaining the electrical circuits of the present invention at a selected temperature at which the components of the electrical circuit are superconductive.

Figure 6:
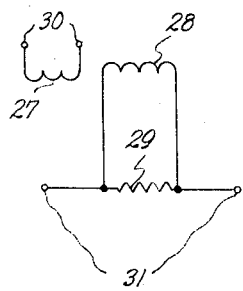
FIG. 6 is a schematic circuit diagram of an electrical circuit having an auxiliary coil.

At temperatures near absolute zero, some materials lose all measurable resistance to the flow of electrical current and become perfect conductors. The phenomenon is called superconductivity and the temperature at which the change occurs from a normally resistive state to the superconductive state is called the transition temperature. For example, the following materials have a transition temperature and become superconductive at the temperatures listed:

| | ° Kelvin |
|---|---|
| Mercury | 4.15 |
| Niobium | 8 |
| Lead | 7.2 |
| Vanadium | 5.1 |
| Tantalum | 4.4 |
| Tin | 3.7 |
| Indium | 3.3 |
| Aluminum | 1.2 |
| Thallium | 2.4 |
| Titanium | 0.5 |

Only a few of the materials exhibiting superconductivity are listed above. Other elements and many alloys and compounds become superconductive at temperatures ranging between 0° and 17° Kelvin. A discussion of many such materials may be found a book entitled, "Superconductivity," by D. Schoenberg, Cambridge University Press, Cambridge, England, 1952.

The above listed transition temperatures apply only where the materials are in a substantially zero magnetic field. In the presence of a magnetic field the transition temperature is decreased so that a given material may be in an electrically resistive state even for temperatures below the normal transition temperature at which the material would be superconductive in the absence of a magnetic field.

In addition, the above listed transition temperatures apply only for values of electrical current flow which do not exceed a critical value. When a current flows through a material in excess of a critical value the transition temperature is decreased so that the material is electrically resistive even though the temperature of the material is lower than the normal transition temperature at which the material would otherwise be superconductive. The action of a current in lowering the temperature at which a transition occurs from normal electrical resistivity to superconductivity is similar to the lowering of the transition temperature by a magnetic field for the reason that the current flowing in the material generates a magnetic field having a strength which if externally applied would lead to the same result in lowering the transistion temperature.

Accordingly, when a material is held at a temperature below its normal transition temperature for a zero magnetic field, the superconductive condition of the material may be extinguished by application of a magnetic field which may originate in an external source or may be internally generated through the flow of current in the material.

FIG. 1 illustrates the variation in transition temperatures ($T_c$) for several materials as a function of an applied magnetic field. In the absence of a magnetic field the point at which each of the several curves intersects the abscissa is the transition temperature at which the material becomes superconductive given in degrees Kelvin. For values of temperature and magnetic field falling beneath each of the several curves, the particular material is superconductive while for values of temperature and magnetic field falling above the curve the material possesses electrical resistance.

The effect of varying the magnetic field applied to a particular material while maintaining the material at a constant temperature lower than the transition temperature is illustrated in FIG. 2 where the dashed line $T_1$ represents a constant temperature line. For a magnetic field greater than the value of the point of intersection between the line $T_1$ and the curve, the particular material is electrically resistive. However, for a magnetic field having a value less than the point of intersection between the line $T_1$ and the curve the material is superconductive.

Since a current flowing in the material has an effect upon the transition temperature similar to a magnetic field, FIG. 2 also represents the effect of varying the current flowing through the material. At a given temperature below the transition temperature, for currents in excess of a critical current ($I_c$), the material is normally resistive, and for currents less than the critical current value, the material is superconductive.

FIG. 3 illustrates an electrical circuit which is adapted to operate in accordance with the foregoing principles. The circuit of FIG. 3 includes a first conductor in the form of an inductance 1 which is constructed of a material having a given transition temperature ($T_c$) at which the material becomes superconductive.

A second conductor in the form of a resistance element 2 is connected in a circuit loop with the inductance 1. The resistance element 2 is constructed of a material having a critical current value ($I_c$) at which the material switches from a superconductive state to a resistive state lower than the critical current value at which the inductance 1 switches from a superconductive state to a resistive state.

In operation, the electrical circuit of FIG. 3 is held at a temperature below the transition temperatures for zero magnetic field of both the resistance element 2 and the inductance 1. Since the material for the resistance element 2 is selected to have a critical current value ($I_c$) lower than the critical current value of the material of the inductance 1, the entire circuit loop is superconductive for current flow less than the critical current of the resistance element 2. Accordingly, no electrical resistance is presented to current flow and once a current is established, the current flows indefinitely. Thus, a persistent circulating current may be established in the circuit loop which will continue so long as the inductance 1 and the resistance element 2 remain superconducting. However, since the resistance element 2 has a critical current value lower than that of the inductance 1, the resistance element 2 is subject to being made electrically resistive by a current flowing around the loop without affecting the superconducting state of the inductance 1 where the value of the current is in excess of the critical current value of the resistance element 2 and is lower than the critical current value of the inductance 1.

In the arrangement of FIG. 3 a current pulse ($I_p$) for initiating a persistent circulating current is derived from a source of electrical current pulses 3. The output circuit of the source of electrical current pulses 3 is connected to a primary winding 4 of a transformer 5. A secondary winding 6 of the transformer 5 is center tapped, and a single-pole double-throw switch 7 is connected across the secondary winding 6 so that either positive or negative current pulses may be derived from the source of electrical current pulses 3. The pulses appearing between the movable element of the single-pole double-throw switch 7 and the center tap of the secondary winding 6 are applied to the circuit loop of the inductance 1 and the resistance element 2 via a pair of terminals 8 and 9.

FIG. 4 is a set of graphs illustrating the relationship between various current and voltage waves appearing in the circuit of FIG. 3. Referring to FIG. 4(a), an initial current pulse 10 ($I_p$) of approximately twice the critical current ($I_c$) of the resistance element 2 is supplied by the source of electrical current pulses 3. When the pulse 10 is first applied to the circuit, the current divides between the inductance 1 and the resistance element 2 in the ratio of their inductances. That is, in the transient period immediately after the application of the pulse to the terminals 8 and 9, the amount of current flowing through the inductance 1 or the resistance element 2 is inversely proportional to the value of the inductance 1 or the resistance element 2. This means that at first practically all the current passes through the resistance element 2 since the resistance element 2 has a minimum amount of inductance. Thus, in FIG. 4(c) a momentary surge of current 11 passes through the resistance element 2. Since the surge of current 11 is in excess of the critical current ($I_c$) for the resistance element 2, the resistance element 2 ceases being superconducting and presents an electrical resistance to the flow of the current with a voltage drop being developed across the resistance element 2 in a conventional fashion. Accordingly, in FIG. 4(d) the voltage ($V_R$) appearing across the resistance element 2 is shown with a voltage pulse 12 corresponding to the surge of current through the resistance element 2.

The appearance of the voltage across the resistance element 2 causes the amount of current flowing through the inductance 1 to increase and the amount of current flowing through the resistance element to decrease until the current flowing through the resistance element 2 drops to a value equal to the critical current ($I_c$) and the resistance element 2 becomes superconductive so that no voltage appears across the resistance element 2. Where the amplitude of the current pulse 10 is approximately two times the critical current value of the resistance element 2, the current divides between the inductance 1 and the resistance element 2 as shown in FIGS. 4(b) and 4(c). When the current pulse 10 drops to zero, the current through the inductance 1 continues due to the action of the inductance 1 in resisting any change in the current flow. However, since the resistance element 2 has substantially no inductance and is superconductive, the current flow through the resistance element 2 reverses and becomes essentially $-I_c$. Since both the inductance 1 and the resistance element 2 are superconducting for values of current flow less than the critical current ($I_c$) the current flows from the inductance 1 around the circuit loop through the resistance element 2 and back through the inductance 1 as a persistent current which continues to circulate indefinitely so long as the inductance 1 and the resistance element 2 are superconducting. By applying either a positive or negative current pulse via the switch 7, a circulating persistent current around the circuit loop may be induced in either direction. Thus, the circuit has two distinct modes of operation corresponding to the direction of persistent current flow which may be selected in accordance with information to be stored.

In order to sense the direction of persistent current flow and to read out the information previously stored in a circuit of the type illustrated in FIG. 3, a current pulse of approximately two times the critical current value ($I_c$) of the resistance element 2 may be applied to the circuit from the source of electrical current pulses 3.

In FIG. 4(a) a negative going pulse 13 is additive with respect to a persistent circulating current flowing through the resistance element 2. The sum of the currents in the resistance element 2 produces a surge of current 14 in excess of the critical current value of the resistance element 2 which causes the resistance element 2 to become electrically resistive with a voltage pulse 15 appearing across the resistance element 2. The voltage pulse 15 reverses the current flow through the inductance 1 as shown in FIG. 4(b), and when the current pulse 13 disappears the inductance 1 causes a current to continue flowing around the circuit loop as a persistent circulating current in a direction opposite to the direction of persistent current before the appearance of the pulse 13. A voltage sensitive output circuit 16 connected across the terminals 8 and 9 senses the appearance of the voltage pulse 15. In contrast, where a current pulse is applied to the circuit loop which is subtractive with respect to the persistent circulating current flowing through the resistance element 2, such as the negative going pulse 17 shown in FIG. 4(a), the current flowing through the resistance element 2 is momentarily decreased as shown in FIG. 4(c), with the resistance element 2 remaining superconducting, and no voltage pulse appears at the terminals 8 and 9.

Thus, by applying a current pulse to the circuit loop the direction of persistent current flow may be ascertained from the appearance of the voltage pulse across the resistance element 2 in the case where the applied pulse is additive with respect to the persistent current flowing in the resistance element 2 and the lack of an appearance of a voltage pulse across the resistance element 2 when the applied pulse is subtractive with respect to the persistent current flowing through the resistance element 2.

From the above it is apparent that the circuit of FIG. 3 is capable of two distinct modes of operation in which a persistent current flows in a selected direction for an indefinite period to represent information, and the direction of persistent current flow may be sensed to read out and recover the information.

FIG. 5 illustrates an alternative embodiment of the circuit of the invention in which four resistance elements 18, 19, 20 and 21 in the form of a bridge are connected across an inductance 22. As in FIG. 3, the inductance 22 may be constructed of a superconductive material having a given critical current value. The resistance elements 18–21 may be constructed of a superconductive material having a critical current value such that a current passing through the bridge in excess of a given amount is capable of rendering the resistance elements electrically resistive without exceeding the critical current value of the inductance 22.

The circuit of FIG. 5 may be initially energized to cause a persistent current to flow by applying a current pulse to the terminals 23 and 24 from a source of electrical current pulses as illustrated in FIG. 3. The bridge of the resistance elements 18–21 acts in substantially the same fashion as a single resistance element in a circuit loop with the inductance 22. However, the inclusion of the bridge of the resistance elements 18–21 leads to a difference in operation with respect to sensing the direction of persistent current flow.

By applying a sensing current pulse to the opposite corners of the resistance bridge via the terminals 25 and 26, a voltage pulse appears at the terminals 23 and 24 whenever a persistent current is flowing in the circuit in either direction. The polarity of the voltage pulse appearing at the terminals 23 and 24 corresponds to the direction of persistent current flow. However, if no persistent current is flowing in the circuit loop the application of a sensing current pulse to the terminals 25 and 26 does not cause a voltage pulse to appear at the terminals 23 and 24. Accordingly, the circuit of FIG. 5 has three modes of operation, namely, no persistent current flowing, a persistent current flowing in one direction, and a persistent current flowing in the opposite direction. In addition, whenever a sensing pulse is applied to the terminals 25 and 26, the current flowing through the inductance 22 is brought to zero so that the circuit of FIG. 5 is always reset to its condition in which no persistent current flows after a sensing pulse is applied to the terminals 25 and 26.

FIG. 6 shows an embodiment of the invention in which an auxiliary coil 27 is coupled to an inductance 28 which forms a part of a superconductive circuit loop with a resistance element 29. By applying a current pulse to the auxiliary coil 27 via the terminals 30 a current pulse is induced in the inductance 28 which may be used to initiate a persistent current around the loop formed by the inductance 28 and resistance element 29.

Figure 7:
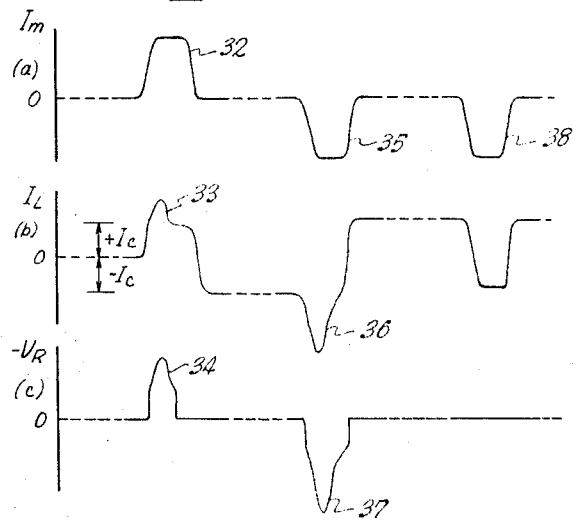
FIG. 7 is a set of graphs illustrating various current and voltage waves which may be applied to and derived from the circuit of FIG. 6.

FIG. 7 is a set of graphs illustrating the current and voltage waves in the circuit of FIG. 6 when the auxiliary coil 27 is employed to induce pulses in the inductance 28. FIG. 7(a) shows a positive going pulse 32 ($I_m$) which may be applied to the auxiliary coil 27 via the terminals 30. As a result, the current through the inductance 28 ($I_L$) takes a momentary surge 33 in excess of the critical current ($I_c$) of the resistance element 29 (FIG. 7(b)) with the result that a voltage pulse 34 appears across the resistance element 29 and the terminals 31 (FIG. 7(c)). When the pulse 32 disappears a persistent current flows around the circuit loop through the inductance 28 and the resistance element 29 as shown in FIG. 7(b). Since the current flow through the resistance element 29 in the circuit of FIG. 6 is equal and opposite to the current flow through the inductance, no separate graph of $I_R$ is given.

When a sensing pulse 35 (FIG. 7(a)) is applied to the circuit of FIG. 6 which is additive with respect to a persistent current flowing through the resistance element 29, a current surge 36 (FIG. 7(b)) passes through the inductance 28 and the resistance element 29 in excess of the critical current of the resistance element 29 and a voltage pulse 37 (FIG. 7(c)) appears at the terminals 31. On the other hand, when a sensing pulse such as the pulse 38 of FIG. 7(a) is applied to the circuit which is subtractive with respect to the persistent current flow through the resistance element 29, the current flowing in the circuit is momentarily decreased as shown in FIG. 7(b) and no voltage pulse appears at the terminals 31.

In an alternative arrangement, the current pulses may be applied to the terminals 31 with the direction of persistent current flow being sensed at the terminals 30. That is, when the interrogating pulse applied to the terminals 31 reverses the direction of current flow around the circuit loop of the inductance 28 and resistance element 29, a voltage pulse is induced in the auxiliary coil 27 and appears at the terminals 30. On the other hand, when no current reversal takes place around the circuit loop no voltage pulse appears at the terminals 30.

Figure 8:
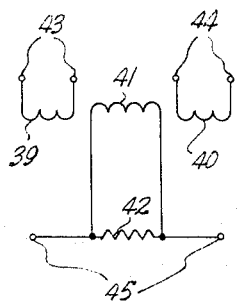
FIG. 8 is a schematic circuit diagram of an electrical circuit including a pair of auxiliary coils.

In FIG. 8 there is shown another alternative embodiment of the invention in which a pair of auxiliary coils 39 and 40 are coupled to an inductance 41 connected in a superconductive circuit loop with a resistance element 42. The auxiliary coils 39 and 40 may be arranged so that a coincidence between current pulses applied to the terminals 43 and the terminals 44 is required to induce a current pulse in the circuit loop of a value in excess of the critical current value of the resistance element 42. Thus, a current pulse applied to only one set of the terminals 43 or 44 is insufficient to set up a persistent current flow or to sense the presence of an already existing current flow. However, by applying current pulses of like polarity to each of the auxiliary coils 39 and 40 via the terminals 43 and 44 a current pulse appears in the circuit having a value in excess of the critical current value of the resistance element 42 which is capable of either initiating a persistent current flow or sensing the presence of a persistent current with a voltage pulse appearing at the terminals 45 when the induced current pulse is additive with respect to the persistent current flowing through the resistance element 42.

FIG. 9 illustrates various current and voltage wave forms which may be applied to and derived from the circuit of FIG. 8. To initiate persistent current flow, a current pulse 46 ($I_{M1}$) of FIG. 9(a) may be applied to the terminals 43, and a current pulse 47 ($I_{M2}$) of the same polarity as the current pulse 46 of FIG. 9(b) may be applied to the terminals 44. FIG. 9(c) shows a resulting current surge 48 in excess of the critical current of the resistance element 42 ($I_c$) though the inductance 41, and FIG. 9(d) shows a voltage pulse 49 appearing across the resistance element 42. To sense the direction of persistent current flow, the current pulses 50 and 51 of like polarity shown in FIGS. 9(a) and 9(b) may be applied to the terminals 43 and 44. Where the induced current pulse is additive with respect to the persistent current flow through the ressitance element 42, a surge of current 52 in excess of the critical current value (FIG. 9(c)) appears in the circuit, and a voltage pulse 53 (FIG. 9(d)) appears at the terminals 45. On the other hand, where the current pulses 54 and 55 (FIG. 9(a) and 9(b)) are additive with respect to each other and are subtractive with respect to the persistent current flowing through the resistance element 42, no voltage pulse appears at the terminals 45.

The set of pulses 56–59 (FIGS. 9(a–d)) illustrate the condition where the applied current pulses 56 and 57 are additive with respect to a persistent current flowing through the resistance element 42 with a surge of current 58 appearing in the circiut loop and a voltage pulse 59 appearing at the terminals 45. However, where a current pulse is applied to only one of the auxiliary coils 39 and 40, such as the current pulse 60 or the pulse 61 of FIG. 9(a), the mode of operation of the circuit is unaffected since the current pulse induced in the circuit loop is not sufficiently large to raise the current flow in the circuit above the critical current value of the resistance element 42 no matter which way the persistent current is flowing.

The action of the circuit of FIG. 8 in requiring a coincidence of a pair of current pulses in order to effect the operation of the circuit and to generate an output voltage pulse may be used to advantage in memory systems in which a large number of separate information storage circuits are connected in the form of a matrix.

Figure 10:
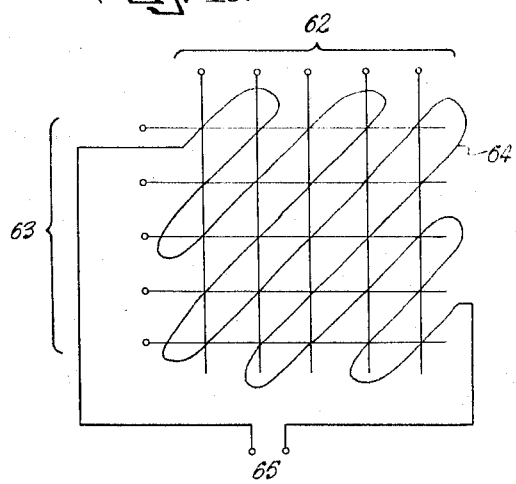
FIG. 10 is a schematic circuit diagram of a matrix for use with a plurality of electrical circuits similar to the one shown in FIG. 8.

FIG. 10 is a schematic circuit diagram of a matrix type memory system for use with a plurality of circuits similar to that shown in FIG. 8. The circuit of FIG. 10 includes a series of vertical crossbar connections 62 and a series of horizontal crossbar connections 63 in a lattice array or matrix. At each intersection of a horizontal crossbar and a vertical crossbar may be located an information storage circuit similar to that shown in FIG. 8. Like auxiliary coils, such as the coil 39 of FIG. 8, are connected serially in each of the horizontal crossbars 63 to form rows. In a similar fashion, like auxiliary coils, such as the coil 40 of FIG. 8, are connected serially in each of the vertical crossbars 62 to form columns. By applying a current pulse to a selected one of the horizontal crossbars and a current pulse to a selected one of the vertical crossbars, any one of the information storage circuits of the matrix may be energized to store information by inducing a persistent current in the selected circuit. In like fashion, the persistent current flow in any one of the circuits in the matrix may be sensed by applying a current pulse to the proper crossbars. The voltage pulse output terminals, such as the terminals 45 of FIG. 8, may all be connected serially, as for example, in a diagonal connection 64 which terminates at a pair of output terminals 65. whenever current pulses are applied to a selected vertical crossbar 62 and a selected horizontal crossbar 63 to sense the direction of persistent current flow in a particular information storage circuit mounted at a junction of the energized crossbars 62 and 63, and the pulses applied to the crossbars are additive with respect to each other and additive with respect to the persistent current flowing through the resistance element of the selected circuit, a voltage pulse appears at the terminals 65. By enlarging the matrix of FIG. 10 any desired amount of information may be stored and recovered.

One arrangement of the inductance and resistance element of a circuit in accordance with the invention is shown in FIGS. 11–13. The circuit of FIG. 11 includes an insulating carrier 66 on one side of which is supported a layer of a suitable material which forms a resistance element 67, as for example, an evaporated metal film. For convenience, the material of the resistance element 67 is extended to form the end portions 68 and 69 which contact the terminal screws 70, 71, 72 and 73. The inductance of the circuit of FIGS. 11–13 comprises several turns of a wire 76. A pair of strips 74 and 75 of the material of the wire 76 may be fastened beneath the nuts on the terminal screws 70–73 to insure a superconductive connection between the inductance wire 76 and the end portions 68 and 69.

Although any materials having the capacity of being rendered superconducting and having the correct relationship of critical current values may be used for the resistance element 67 and the inductance as described above, one suitable material for the inductance wire 76 is lead. Where lead is selected for the inductance wire, examples of suitable materials for the resistance element are tantalum, tin, or alloys thereof.

FIGS. 14 and 15 show an alternative arrangement of the circuit of the invention constructed by printed circuit techniques in which one layer 77A of an inductance and a resistance element 79 are supported on one side of an insulating carrier 78 (FIG. 14), and another layer 77B of the inductance is supported on the other side of the carrier 78 (FIG. 15). The inductance layers 77A and 77B are connected together at their centers to form a continuous inductance. The layer 77A terminates at one end of the resistance element 79 at a terminal 80A (FIG. 14) while the other layer 77B is connected to the other end of the resistance element 79 through the carrier 78 at a terminal 80B (FIG. 15) to form a circuit loop.

Figure 16:
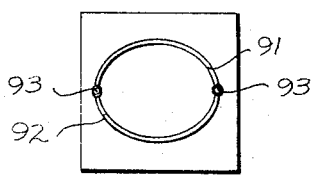
FIG. 16 is a plan view of an electrical circuit of the invention in the form of a simple circuit loop.

Although the circuit has previously been described as a pure resistance and a pure inductance, the presence of inductance in the resistance element does not cause trouble, and the inductance does not have to be large. Therefore, the inductance may be provided by a distributed inductance in any part of the circuit loop. For example, in FIG. 16, a circuit loop is shown which includes a first conductor 91 which may be constructed of a superconductive material having a given critical current value ($I_c$). By including a second conductor 92 in the circuit loop of a superconductive material having a critical current value ($I_c$) lower than the critical current value of the first conductor, the second conductor may be switched from a superconductive condition to a resistive condition in a manner similar to that described above by applying pulses to the terminals 93 with a persistent circulating current being sustained around the circuit loop. Accordingly, conventional schematic circuit diagram symbols for the inductances and resistance elements of the illustrative embodiments of FIGS. 3, 5, 6 and 8 have been used for convenience and for purposes of explanation and do not necessarily indicate the presence of conventional circuit components.

FIG. 17 is a diagrammatic illustration of an arrangement for maintaining the circuits of the present invention at a suitable low temperature near absolute zero. In FIG. 17 there is shown an exterior insulated container 81 which is adapted to hold a coolant such as liquid nitrogen. Within the container 81 an inner insulated container 82 is suspended for holding a coolant, such as liquid helium which maintains the circuits of the invention at the proper operating temperature. Where the inductance is constructed of lead and the resistance element is constructed of tantalum, a suitable operating temperature is 4.2° Kelvin which is the boiling point of helium. The top of the container 82 may be sealed by a sleeve 83 and lid 84 through which a conduit 85 connects the inner chamber with a vacuum pump 86 and a pressure regulation valve 87. The pump 86 functions to lower the atmospheric pressure within the chamber so as to control the temperature of the helium. The pressure regulation valve 87 functions to regulate the pressure within the chamber so that the temperature is held constant. One or more information storage circuits 88 of the invention may be suspended in the liquid helium at the proper operating temperature at which the circuit components are superconductive. Connection to the circiuts 88 is made by two separate pairs of lead-in wires 89 which also may be constructed of a superconductive material within the cooled region to minimize resistance. The lead-in wires 89 extend through the lid 84 to the terminals 90. One pair of the lead-in wires may be used to apply energizing pulses to the circuit while the other pair may be used to derive voltage pulses from the circuit.

In operation it has been found that the circuits of the invention possess a relatively fast switching time of less than 0.5 microseconds. That is, the devices are capable of being switched from one mode of operation to the other very rapidly and are adapted to receive and read out stored information very quickly.

The relatively short time required for a complete reversing current pulse comes about because the delay time $t_1$, for cessation of superconductivity when the current in the resistance element exceeds the critical current ($I_c$) is short. The delay time, $t_2$, for return of superconductivity when the current falls below the critical current ($I_c$) is also short. These delay times are many times shorter than the delay times that are observed when a superconductor is placed in a uniform externally applied magnetic field. It is believed that the delay times are determined by the velocity of motion of a boundary surface that exists between superconducting and normal regions in a superconductor and on the geometrical shapes that such boundary surfaces take on. In the case of $t_1$, the delay time for cessation for superconductivity, the paths of current flow, as cessation is approached, follow the remaining superconducting threads and yield high local magnetic fields. The material then breaks into islands of superconducting material separated by normal material. This condition has been called the "intermediate state" of a superconductor for many years. On return to superconducting behavior "seeds" of superconducting regions are needed. These are present and are scattered through the material in large numbers when the transition has been caused by current flow in the specimen itself. The presence of these "seeds" greatly reduces the delay time $t_2$ for return of superconductivity. For the situation in which cessation of superconductivity has been caused by an externally applied magnetic field said "seeds" are usually not present, or at least are few in number, and the delay time $t_2$ is usually large. Similarly, when a magnetic field is applied externally the delay time $t_1$ for the cessation of superconductivity is long because the magnetic field is relatively uniform and the velocity of motion of the boundary surfaces between superconducting and normal material is low.

In order to increase the density of the magnetic field generated by currents flowing within the conductors, and hence reduce the switching time, the conductors may be made in other than a cylindrical cross section. For example, in the evaporated layer circuit arrangement of FIGS. 11, 12, and 13 the resistance element comprises a relatively thin strip having a relatively small cross sectional area. This thin strip construction gives rise to an intensification of the magnetic field produced by a given current flow through it, which in turn lowers the critical current value; this decreases the switching time. Thus, if a given value of current is applied to two superconductive conductors constructed of the same material (e.g., of lead), and one conductor has a cylindrical cross section and the other conductor has a smaller cross section in the form of a thin strip, the thin strip conductor will become resistive before the cylindrical conductor (the minimum cross section of the thin strip conductor being less than that of the cylindrical conductor). Current values may be selected such that the magnetic flux density in the larger cross section cylindrical conductor will be insufficient to render it resistive, and yet be sufficient to give rise to a higher magnetic flux density in the smaller cross section thin strip conductor so as to render the latter resistive. Thus, the resistance element 29 of FIG. 6 may be made of the same material as that of the inductance 28, but with the resistance element having a smaller cross section than that of the inductance.

The velocity of motion of the boundary surface between superconducting and normal regions can be increased and thus the delay times reduced by alloying the material with small concentrations of other chemical elements. A negative surface tension for the boundary can be achieved by this means resulting in high surface velocity. At the same time, the resistivity of the normal state is increased, reducing the eddy currents associated with boundary surface motions and thus speeding the motion. Addition of alloying elements also increases the resistance of the material when in the nonsuperconducting condition, permitting larger voltage signals for a given cross section of the resistance element.

Suitable alloying elements, for example, in the case of tin are antimony and indium. Both of these elements form solid solutions with tin so that the antimony or indium atoms are randomly scattered through the tin crystals, with the antimony or indium atoms substituting for tin atoms in the crystal lattice. Both antimony and indium differ by unity in valence from tin so that they scatter the electron waves in the tin by coulomb scattering. Hence they contribute a large electrical resistivity per atom percent addition.

Although the following values are given by way of example only, it has been found that the value of the inductance 1 may be of the order of 1 microhenry and the value of the resistance element in a resistive condition may be of the order of .5 ohm. Workable embodiments have been constructed in which the physical dimensions of a strip of tin for the resistance element were as follows:

| | Centimeter |
|---|---|
| Thickness | $3.4 \times 10^{-5}$ and $10.2 \times 10^{-5}$ |
| Width | 0.27 to 0.18 |
| Length | .635 |

The value of the inductance should be large enough that the time constant for decay of circulating current $L/R$ when the resistance element is not superconducting, is about as large as or larger than the delay times required for the resistance element to change from resistive to superconducting and vice versa. For a given delay time, the value of the inductance then depends on the value of the resistance element and thus a smaller resistance will permit a smaller inductance and a consequent smaller space required for the inductance. The value of the resistance element should be large enough to generate a suitable voltage pulse but should not be so large as to generate substantial amounts of heat or require substantial amounts of power to switch the device from one mode of operation to the other.

Although the circuits of the invention may be switched from one mode of operation to another mode of operation through the application of pulses as described above, an alternative method for switching is to vary the temperature at which the device is sustained so as to render one portion of the circuit electrically resistive without affecting the superconductive condition of another portion of the circuit. In the apparatus of FIG. 17, a variation in temperature may be achieved through the operation of the pressure regulation valve 87. Since an electrical circuit of the invention may be constructed of two superconductive materials having separate and distinct transition temperatures ($T_c$), the portion of the circuit having a lower transition temperature may be switched from a superconducting to an electrically resistive condition without affecting the superconducting condition of the remainder of the circuit.

By means of the invention, an information storage circuit is provided having a relatively fast switching time and a relatively small size. Accordingly, a large number of the circuits may be grouped together in a digital computer or data processing system to provide a small volume high capacity memory system. So long as the circuits of the invention are maintained at the proper temperature, information may be stored indefinitely without requiring any regeneration of the information or electrical power. In addition, due to the simplicity of construction of the circuits a high degree of reliability in operation may be achieved.

In labeling the apparatus described herein an electrical circuit or an information storage circuit, it is intended that the words be given a broad meaning to cover any variety of circuit in which a persistent current is adapted to circulate around a circuit loop in accordance with the invention. Accordingly, use of the invention as a memory device, as a switching circuit, as an amplifier, as a control circuit, or for any other purpose should be considered within the scope of the invention as defined in the claims.

When a large number of the superconductive electrical circuits of the invention are grouped together in a relatively small space, as for example in a digital computer, a data processing system or a memory system, interaction or crosstalk between the circuits may be avoided by shielding each of the circuits with superconductive material. A property of superconductive materials is that the materials are near perfect barriers to the passage of a magnetic field while superconducting. Accordingly, the electrical circuits of the invention may be effectively isolated from each other by a shield of a superconductive material. For example, where printed circuits such as that illustrated in FIGS. 14 and 15 are mounted adjacent one another in a series of layers, sheets of a material which is superconducting at the temperature of operation may be interleaved with the insulating carriers bearing the printed circuit components. In a case where the printed circuit components are arranged on one side of the carrier only, a layer of superconductive material deposited on the other side of the carrier may be used as a shield between adjacent circuits.

Although the condition of a material while superconducting has been described herein as being a condition of zero resistance, it will be appreciated that a small amount of resistance may be present in the superconducting condition of a material which does not necessarily affect the operation of the circuit. The words "zero resistance" in the above description and in the following claims have been used to describe a condition of conductivity sufficient to allow the circuits of the invention to function substantially as described. Accordingly, the invention should not be limited by the use of the words "zero resistance," or any other particular words, which have been used to explain the theory of operation.

What is claimed is:

1. An electrical circuit including the combination of a superconductive inductance constructed of a material having zero electrical resistance at a predetermined temperature for electrical current flow less than a first critical current value, a superconductive resistance element having zero electrical resistance at said predetermined temperature for electrical current flow less than a second critical current value, said second critical current value being lower than said first critical current value, said inductance and said resistance element being connected in a circuit loop which is capable of sustaining a persistent circulating current in a selected direction so long as both the inductance and the resistance element are superconducting, means for establishing a persistent circulating current within said loop having a value less than said second critical current value, said resistance element being capable of becoming electrically resistive in response to current flow therethrough in excess of the second critical current value while the inductance remains in a superconductive condition, and means for selectively causing current to flow through said resistance element in excess of the second critical current value for generating a voltage to reverse the direction of current flow around the circuit loop.

2. An electrical circuit in accordance with claim 1 in which the resistance element comprises a thin strip of a superconductive material within which a magnetic field produced by the flow of current through the material is concentrated to provide a fast transition from a superconductive condition to a resistive condition and within which islands of superconducting material remain when the resistance element is in a resistive condition to provide a fast transition from a resistive condition to a superconductive condition.

3. An electrical circuit including the combination of a first superconductive conductor, a second superconductive conductor connected in a circuit loop with the first conductor, means establishing a persistent circulating current around said circuit loop, said conductors being adapted to sustain said persistent circulating current around the circuit loop so long as both of the conductors are superconducting, and means coupled to said circuit loop for rendering one of said conductors electrically resistive only for a selected magnitude and direction of said established persistent circulating current while the other of said conductors remains in a superconductive condition, said conductor which is rendered electrically resistive comprising a piece of material having a cross-sectional configuration which concentrates the magnetic field generated within the material by electrical current flow therethrough and which is adapted to sustain islands of superconducting material when in a resistive condition to provide a fast transition from a resistive condition to a superconductive condition.

4. An electrical circuit including the combination of a first superconductive conductor constructed of a material having a first predetermined critical current value, a second superconductive conductor constructed of a material having a second predetermined critical current value, said second critical current value being lower than said first critical current value, said first and said second conductors being connected in a circuit loop which is capable of sustaining a persistent circulating current in a selected direction so long as both of the conductors are superconducting, said second conductor being capable of becoming electrically resistive in response to current flow therethrough in excess of the second predetermined critical current value while the first conductor remains in a superconductive condition, means for applying a current pulse to the circuit loop to initiate a persistent circulating current in a selected direction, said last named means also being adapted to apply a sensing current pulse to the circuit loop which renders the second conductor electrically resistive when the sensing current pulse is additive with respect to the persistent current flowing through the second conductor, and a voltage sensitive output circuit coupled to the circuit loop for sensing the appearance of a voltage in the circuit loop when the second conductor is rendered electrically resistive.

5. An electrical circuit in accordance with claim 4 in which said means for applying a sensing current pulse comprises a source of current pulses having a magnitude of twice said second critical current value whereby the second conductor becomes electrically resistive when the sensing current pulse is additive with respect to the persistent current flowing through the second conductor and remains superconducting when the sensing current pulse is subtractive with respect to the persistent current flowing through the second conductor.

6. An electrical circuit including the combination of a first superconductive conductor, a second superconductive conductor connected in a circuit loop with the first superconductive conductor, said conductors being adapted to sustain a persistent circulating current around the circuit loop so long as both of the conductors are superconducting, said circuit loop having at least a portion exhibiting inductive characteristics, said first and second conductors having distinctly different values of critical current so that one of the conductors is capable of being switched to an electrically resistive condition for values of current flow for which the other of the conductors remains in a superconductive condition, means for applying a current pulse to the circuit loop to initiate a persistent circulating current in a selected direction and for applying a sensing current pulse to the circuit loop which renders one of the conductors electrically resistive when the sensing current pulse is additive with respect to the persistent current flowing through that conductor, and a voltage sensitive output circuit coupled to the circuit loop for sensing the appearance of a voltage in the circuit loop.

7. An electrical circuit including the cobination of a conductor having zero electrical resistance at a predetermined temperature for electrical current flow less than a first critical current value, a resistance element connected in a circuit loop with the first conductor having zero electrical resistance at said predetermined temperature for electrical current flow less than a second critical current value, said second critical current value being lower than said first critical current value, said conductor and said resistance element having a first mode of operation in which a persistent current is sustained around the circuit loop in a first direction, said conductor and said resistance element having a second mode of operation in which a persistent current is sustained around the circuit loop in a second direction, means for applying a current pulse to the circuit loop to initiate a persistent current in a selected direction and for applying a sensing current pulse to the circuit loop which renders the resistance element eletrically resistive when the sensing current pulse is additive with respect to the persistent current flowing through the resistance element, and a voltage sensitive output circuit coupled to the circuit loop for sensing the appearance of a voltage in the circuit loop when the resistance element is rendered electrically resistive.

8. An electrical circuit in accordance with claim 7 in which said means for applying a sensing current pulse comprises a source of current pulses having a magnitude of twice said second critical current value whereby the resistance element becomes electrically resistive when the sensing current pulse is additive with respect to the persistent current flowing through the resistance element and remains superconducting when the sensing current pulse is subtractive with respect to the persistent current flowing through the resistance element.

9. An electrical circuit including the combination of a superconductive inductance constructed of a material having zero electrical resistance at a predetermined temperature for electrical current flow less than a first critical current value, a superconductive resistance element having zero electrical resistance at said predetermined temperature for electrical current flow less than a second critical current value, said second critical current value being lower than said first critical current value, said inductance and said resistance element being connected in a circuit loop which is capable of sustaining a persistent circulating current in a selected direction so long as both the inductance and the resistance element are superconducting, said resistance element being capable of becoming electrically resistive in response to current flow therethrough in excess of the second predetermined critical current value while the inductance remains in a superconductive condition, said resistance element being capable of generating a voltage when in an electrically resistive condition to reverse the direction of current flow around the circuit loop, means for applying a current pulse to the circuit loop to initiate a persistent current in a selected direction and for applying a sensing current pulse to the circuit loop which renders the resistance element electrically resistive when the current pulse is additive with respect to the persistent current flowing through the resistance element, and a voltage sensitive output circuit coupled to the circuit loop for sensing the appearance of a voltage in the circuit loop when the resistance element is rendered electrically resistive.

10. An electrical circuit including the combination of a first superconductor having a particular value of critical current, a second superconductor having a particular value of critical current different from said first superconductor, said superconductors being in circuit with one another, and means for establishing a persistent circulating current within said circuit, and for detecting an output voltage across the circuit for current in one of said superconductors in excess of its critical current value.

11. An electrical circuit including the combination of a first superconductor having a particular value of critical current, a second superconductor connected in parallel with said first superconductor and having a particular value of critical current different from the particular value of critical current of said first superconductor, means for establishing a persistent circulating current through said superconductors and means for detecting an output voltage for current in one of said superconductors in excess of its value of critical current.

References Cited by the Examiner

UNITED STATES PATENTS

| | | | |
|---|---|---|---|
| 2,666,884 | 1/1954 | Ericsson et al. | 340—173.1 |
| 2,832,897 | 4/1958 | Buck | 340—173 |
| 2,913,881 | 11/1959 | Garwin | 340—173.1 |

OTHER REFERENCES

Physica, vol. 2, 1935, pp. 935–941, by J. M. Casimer-Jonker et al.

Transactions of the Royal Society of Canada, vol. 30, Section III, 1936, pp. 13–31, by H. G. Smith et al.

General Electric Review, June 1956, pp. 19–25 (Hewlett).

"The Cryotron—A Superconductive Computer Element," by D. A. Buck, April 1956—Proceedings of the IRE (pages 482–493).

JAMES W. MOFFITT, *Acting Primary Examiner.*

E. R. REYNOLDS, IRVING SRAGOW, STEPHEN W. CAPELLI, *Examiners.*

M. T. PLATT, K. E. JACOBS, T. W. FEARS,
*Assistant Examiners.*